(12) United States Patent
Ulrich (10) Patent No.: US 11,846,377 B2
(45) Date of Patent: Dec. 19, 2023

(54) TUBULAR CONNECTION DEVICE (71) Applicant: A. RAYMOND ET CIE, Grenoble (FR)

(72) Inventor: Jerôme Ulrich, Sait Balise du Buis (FR)

(73) Assignee: A. RAYMOND ET CIE, Grenoble (FR)

(*) Notice: Subject to any disclaimer, the term of this patent is extended or adjusted under 35 U.S.C. 154(b) by 260 days.

(21) Appl. No.: 17/262,679

(22) PCT Filed: Jul. 3, 2019

(86) PCT No.: PCT/FR2019/051647
§ 371 (c)(1),
(2) Date: Jan. 22, 2021

(87) PCT Pub. No.: WO2020/021179
PCT Pub. Date: Jan. 30, 2020

(65) Prior Publication Data
US 2021/0301961 A1    Sep. 30, 2021

(30) Foreign Application Priority Data

Jul. 24, 2018  (FR) ........................................ 1856856

(51) Int. Cl.
*F16L 37/12*    (2006.01)
(52) U.S. Cl.
CPC ................ *F16L 37/1225* (2013.01)
(58) Field of Classification Search
CPC ..... F16L 37/1225; F16L 37/14; F16L 37/142; F16L 37/144; F16L 37/0885
See application file for complete search history.

(56) References Cited

U.S. PATENT DOCUMENTS 7,387,318 B2    6/2008  Yoshida
2001/0043833 A1*  11/2001  Bahner ............... F16L 37/0885
403/187
(Continued)

FOREIGN PATENT DOCUMENTS

EP    2402640 B1    1/2013
EP    1705417 B1    4/2013

OTHER PUBLICATIONS

International Search Report for International Application No. PCT/FR2019/051647 dated Oct. 30, 2019, 2 pages.
(Continued)

*Primary Examiner* — Aaron M Dunwoody
(74) *Attorney, Agent, or Firm* — TraskBritt (57) ABSTRACT

A tubular connection device includes a female connector into which a male end piece having an annular groove may be inserted. The female connector has two lateral slits. The device further includes a U-shaped clip having a head and two branches straddling the female connector. Each branch extends into a lateral slit and ends with a foot. The device further includes a ring having two lateral openings facing the lateral slits of the female connector, and two lateral guide systems cooperating with the feet of the clip to keep the clip in a raised position or in a pressed-in position. Each guide system includes a notch, a plate delimiting a lower edge of the notch, and a lug arranged on a flexible tab carried by the ring. The annular groove faces the lateral slits to allow the clip to switch between the pressed-in position and the raised position.

20 Claims, 6 Drawing Sheets

(56) References Cited

U.S. PATENT DOCUMENTS

| | | | | |
|---|---|---|---|---|
| 2004/0178629 A1* | 9/2004 | Yoshida | ............ | F16L 37/0885 285/305 |
| 2006/0214420 A1* | 9/2006 | Mori | ............ | F16L 37/0885 285/319 |
| 2012/0104746 A1* | 5/2012 | Fansler | ............ | F16L 37/0885 285/239 |
| 2015/0101173 A1* | 4/2015 | Hartmann | ............ | F16L 37/0885 285/86 |
| 2015/0233510 A1* | 8/2015 | Nezu | ............ | F16L 37/144 285/247 |
| 2017/0356581 A1* | 12/2017 | Trotter | ............ | F16L 37/0885 |

OTHER PUBLICATIONS

International Written Opinion for International Application No. PCT/FR2019/051647 dated Oct. 30, 2019, 5 pages.

* cited by examiner

TUBULAR CONNECTION DEVICE

CROSS-REFERENCE TO RELATED APPLICATIONS

This application is a national phase entry under 35 U.S.C. § 371 of International Patent Application PCT/FR2019/051647, filed Jul. 3, 2019, designating the United States of America and published as International Patent Publication WO 2020/021179 A1 on Jan. 30, 2020, which claims the benefit under Article 8 of the Patent Cooperation Treaty to French Patent Application Serial No. 1856856, filed Jul. 24, 2018.

TECHNICAL FIELD

The present disclosure relates to a tubular connection device for connecting pipes or conduits. It is used, in particular, in the automotive field and more particularly in fluidic connections of cooling systems.

BACKGROUND

Tubular connection devices that make it possible to connect a female connector and a male end piece to one another are found in the prior art, the connection between these elements being locked by a metal clip.

For example, in U.S. Pat. No. 7,387,318, the female connector comprises lateral slits that are diametrically opposed and are symmetrical with respect to a radial axis. A U-shaped clip, formed of a head connected to two branches, encloses the female connector; the clip can occupy two positions:

- a pressed-in position in which the head of the clip is in contact with the female connector; the branches of the clip pass through the female connector and open into its interior volume, substantially parallel to the radial axis. When the male end piece, which has a frustoconical collar equipped with an annular groove, is inserted into the female connector, the branches of the clip are pushed apart by the collar, then blocked in the annular groove, when the male end piece is fully inserted into the female connector. In this pressed-in position of the clip, the connection between the female connector and the male end piece is locked.
- a raised position in which the head of the clip is distant from the connector; the branches are kept substantially tangential to the connector and do not open into its interior volume. The male end piece can thus be separated from the female connector.

This device has the drawback of not having a visual means making it possible to know whether the connection has been correctly established.

To address this problem, European Patent No. 2,402,640 discloses a tubular connection device provided with a locking indicator. In this device, when the male end piece is inserted into the female connector, the clip can only be placed in the pressed-in locking position if the male end piece is correctly positioned. Thus, the position of the clip during the insertion of the male end piece shows the state of the connection. However, it is possible to position the clip in the pressed-in locking position in the absence of the male end piece.

BRIEF SUMMARY

An aim of the present disclosure is to propose an alternative solution to the state of the art. It aims, in particular, to avoid the configuration where the clip is in the pressed-in locking position when the male end piece has not been inserted.

With a view to achieving this object, an embodiment of the present disclosure is a tubular connection device comprising:

- a female connector, into which a male end piece provided with an annular groove is intended to be inserted, the female connector being provided with two lateral slits that are symmetrical with respect to a radial axis;
- a U-shaped locking clip comprising a head and two branches, and straddling the female connector, each branch extending into a lateral slit and ending with a foot;
- two lateral guide systems that are symmetrical with respect to the radial axis, cooperating with the feet of the clip in order to keep it in a raised position of disconnection of the male end piece or in a pressed-in position for locking the male end piece in the female connector.

According to the present disclosure, the device comprises a ring arranged against an internal wall of the female connector and provided with two lateral openings facing the lateral slits. In addition, each guide system comprises:

- a notch, formed in the female connector, adjacent to the lateral slit;
- a plate delimiting a lower edge of the notch and on which the foot rests in order to keep the clip in an intermediate position, between the raised position and the pressed-in position, in the absence of a male end piece; and
- a lug arranged on a flexible tab carried by the ring, and intended to at least partially fill the notch and the plate when the male end piece is inserted into the connector, its annular groove facing the slits and the lateral openings, in order to allow the clip to switch to a pressed-in position or to a raised position.

According to other advantageous and non-limiting features of the present disclosure, taken alone or in any technically feasible combination:

- each guide system comprises a first ramp for guiding the foot between the raised and intermediate positions of the clip, and a second ramp for guiding the foot between the intermediate and pressed-in positions, the first ramp and the second ramp being formed on the female connector;
- the first ramp and the second ramp are inclined substantially tangentially to the internal wall of the female connector and separated from each other by the notch;
- the first ramp is delimited in the lower part by the notch and in the upper part by a flange forming a stop for the foot of the clip;
- the first ramp comprises a hollow near the flange forming a retaining zone for the foot, so as to keep the clip in the raised position;
- the second ramp is delimited in the upper part by the plate and in the lower part by a bearing on which the foot of the clip is positioned when the clip is in the pressed-in position;
- the lug partially fills the plate when the male end piece is inserted, its annular groove being opposite the lateral slits, the foot of the clip resting on an unfilled edge of the plate, placing the clip in a transitional position, between the intermediate position and the pressed-in position;
- the second ramp comprises a first shoulder on which the foot of the clip is able to rest in order to place the clip in a transitional position, between the intermediate position and the pressed-in position;

each guide system comprises a blocking element formed on the female connector and configured to block the separation of the branch of the clip, when the clip is in the pressed-in position;

the blocking element comprises a second shoulder facing the first shoulder, the two shoulders being separated by a space substantially less than a width of the foot;

the outer surface of the blocking element forms a third ramp, which is inclined toward the bottom and the outside of the female connector;

the lug of the flexible tab forms a ramp, which is inclined substantially tangentially to the internal wall of the female connector;

the flexible tab is formed by a portion of the ring adjoining the lateral opening;

the head of the clip has at least one stop cooperating with holes made in the female connector, to prevent the positioning of the clip in the pressed-in position during the insertion of the male end piece as long as its annular groove is not facing the lateral slits;

the notch is formed by an enlargement of the lateral slit.

BRIEF DESCRIPTION OF THE FIGURES

Further features and advantages of embodiments of the present disclosure will become apparent from the following detailed description made with reference to the accompanying drawings, in which.

DETAILED DESCRIPTION

In order to simplify the following description, the same reference signs are used for identical elements or for elements performing the same function. The figures are schematic representations that, for the sake of readability, are not necessarily to scale.

General description of the tubular connection device

Figure 1A:
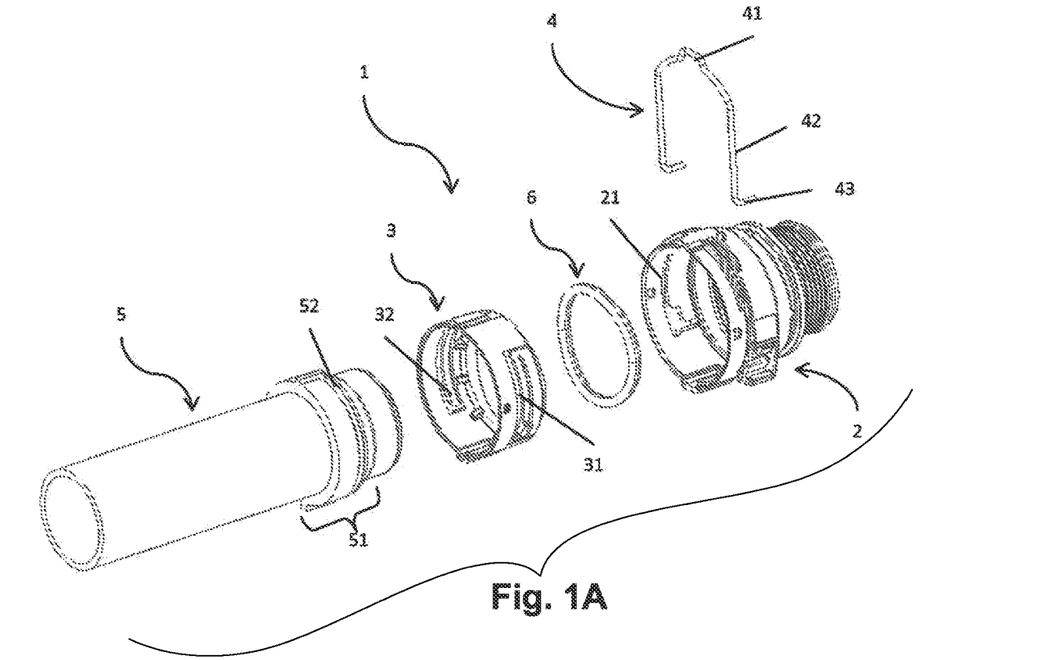
FIGS. 1A and 1B, respectively, show a tubular connection device according to the present disclosure in exploded view and in assembled view.

FIG. 1A shows an exploded view of a tubular connection device 1 according to the present disclosure. The device is also shown, in FIG. 1B, in overall view.

The tubular connection device 1 is composed of a tubular female connector 2, a ring 3 and a locking clip 4. The purpose of the tubular connection device 1 is to keep a tubular male end piece 5 connected to the female connector 2. More particularly, the male end piece 5 is tubular in shape and has a frustoconical collar 51 provided with an annular groove 52. The male end piece 5 is inserted along a main axis into the female connector 2 and held locked to the female connector 2 by the clip 4 when the clip 4 is arranged in the annular groove 52. The male end piece 5 may also be provided with at least one guide rib intended to interact with at least one groove of suitable size arranged on the internal surface of the female connector 2 to prevent the rotation of the male end piece 5 during its insertion into the female connector 2. The female connector 2, the male end piece 5 and the ring 3 can be made of a plastic or metallic material.

The ring 3 is housed in the female connector 2, against the internal wall of the female connector 2. Notches can be arranged on the outer surface of the ring 3 so as to clip into openings, which are present on the inner surface of the female connector 2 to keep the ring 3 secured to the female connector 2. The ring 3 can also be secured to the female connector 2 by soldering or any other known technique. In order to improve the sealing of the connection device 1, it is advantageous to insert a sealing gasket 6 into the female connector 2 before assembling the ring 3 to the female connector 2. The sealing gasket 6 is thus held in place between the ring 3 and the female connector 2.

The clip 4 has a U shape and includes a head 41 connected to two branches 42 each ending with a foot 43. The two feet 43 of the clip 4 form a widening of the end of the branches 42 of the clip 4 along the main axis of the connection device 1. Advantageously, the branches 42 and the feet 43 of the clip 4 are arranged in an L shape. In other words, the feet 43 are oriented along the main axis, when the clip 4 is inserted transversely into the female connector 2. The feet 43 can be formed by folding the end of the branches 42 of the clip 4. It is conceivable to adapt the connection device 1 to a form of feet other than that shown in FIG. 1A. Whatever shape is chosen, a foot 43 forms an enlargement of the end of the branches in the main direction. The clip 4 is advantageously made of a metallic material.

Figure 1B:
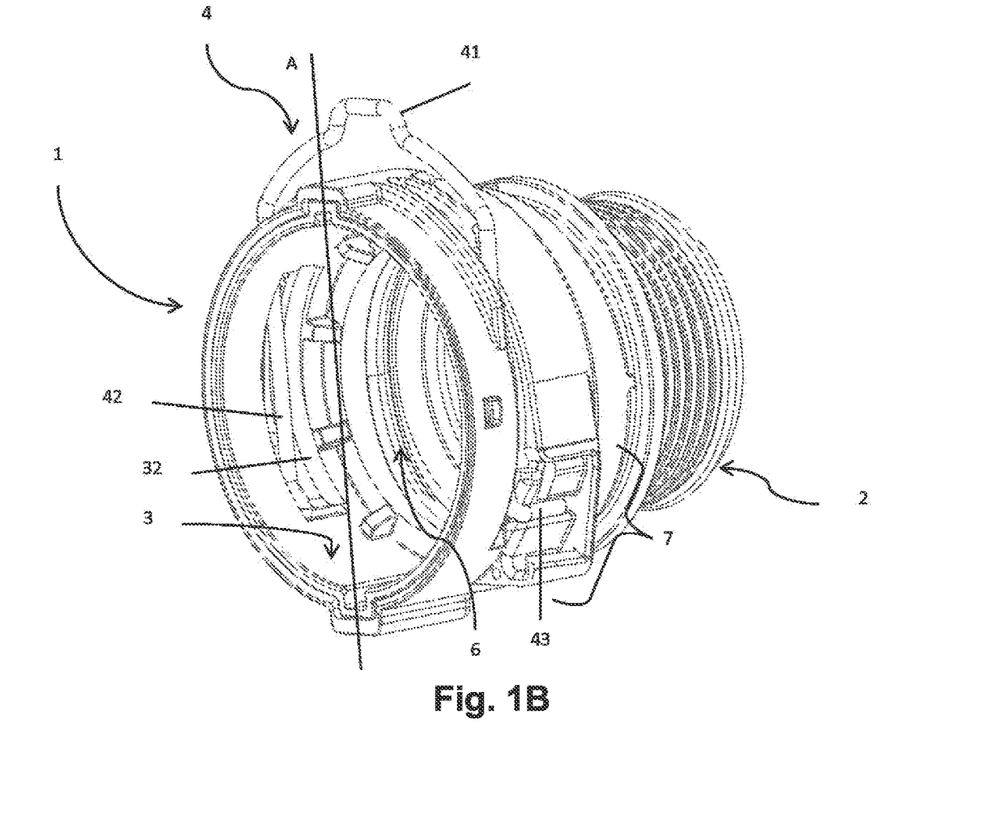
Figure 2:
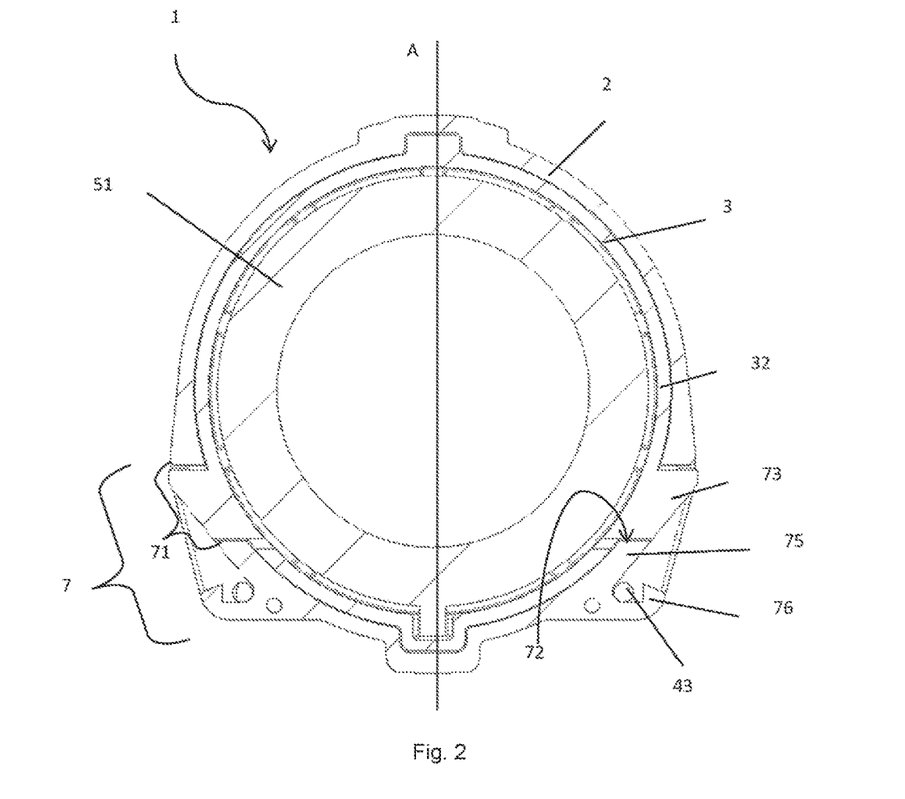
FIG. 2 represents a guide system according to the present disclosure in section in a transverse plane, the clip being in the pressed-in locking position.

The female connector 2 is provided with two lateral slits 21 that are symmetrical with respect to a radial axis A shown in FIGS. 1B and 2. The ring 3 is also provided with two lateral openings 31, which are also symmetrical with respect to the radial axis A. The lateral slits 21 of the female connector 2 as well as the lateral openings 31 of the ring 3 are arranged facing each other, when the ring 3 is inserted into the female connector 2. The width of the lateral slits 21 and of the lateral openings 31 is chosen to substantially correspond to the dimension of the branches 42 of the clip 4.

The clip 4 is assembled so as to overlap the female connector 2, the branches 42 of the clip 4 penetrating through the lateral slits 21 and the lateral openings 31. The feet 43 of the clip 4, which cannot, due to their dimensions, pass through the lateral slits 21 and lateral openings 31, bear against the outer surface of the female connector 2.

In the remainder of the disclosure, it will be considered that the head 41 of the clip 4 defines the top of the clip 4.

Thus, when reference is made, for example, to the "top," "top part" or "upper part" of a part of the device, this designates any region or element located in the half of this part, which is closest to the head 41 of the clip 4, the two halves of the part being delimited by a transverse plane perpendicular to the radial axis A. Consequently, the term "bottom," "bottom part" or "lower part" will denote any region or element located in the half furthest from the head 41 of the clip 4.

Advantageously, the upper outer surface of the female connector 2 can be provided with elements for holding the head 41 so as to limit any longitudinal movement of the clip 4. It may, for example, be a groove to accommodate the head 41 of the clip 4 or else ribs surrounding the head 41 of the clip 4 on either side.

The role of the clip 4 is to lock the connection by accommodating its branches 42, through the lateral slits 21 and lateral openings 31, in the groove 52 of the male end piece 5. The clip 4 also serves as a visual indicator of the connection status. As such, the clip 4 can occupy a raised disconnection position, a pressed-in locking position as well as an intermediate delivery position. In the intermediate position, the clip 4 is located in elevation between the raised disconnection position and the pressed-in locking position.

In order to be able to guide the clip 4 correctly and keep it in the appropriate positions to reflect the state of the connection, the tubular connection device 1 is provided with guide systems 7, which cooperate with the feet 43 of the clip 4.

Description of the Guide Systems

The connection device 1 comprises two guide systems 7 that are arranged symmetrically with respect to the radial axis A, and located at the lower part of the connection device 1. In the remainder of the disclosure, when a guide system is described, it should be understood that the same description applies to each of the guide systems 7, which are symmetrical to one another.

Figure 1C:
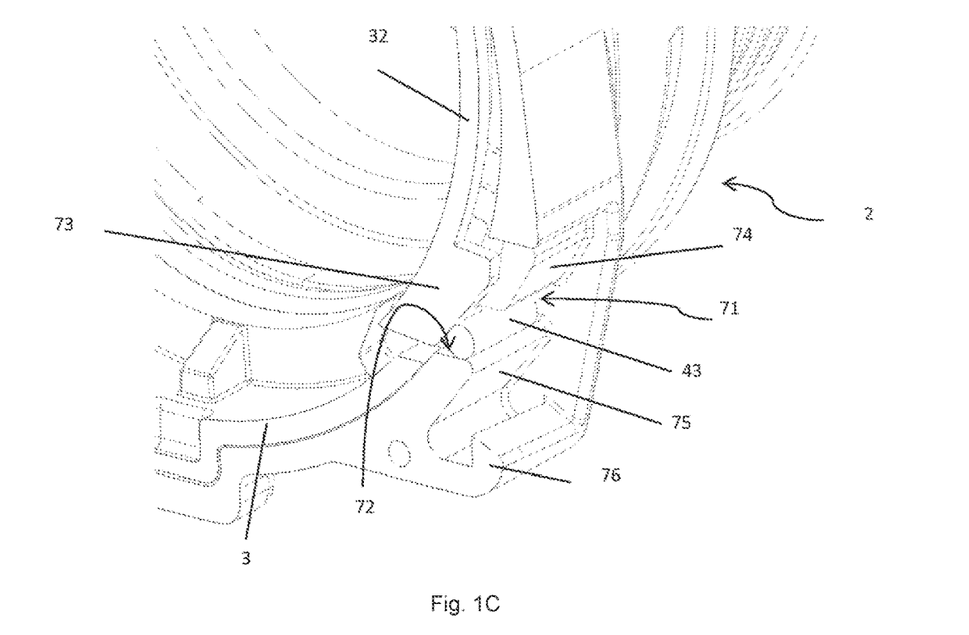
FIG. 1C shows a zoom of FIG. 1B at a guide system according to the present disclosure, the clip being in the intermediate position.

FIG. 1C shows an enlarged view of the guide system 7 of FIG. 1B, starting on a transverse sectional plane located after the branches 42 of the clip 4, which explains why only the foot 43 of the clip 4 is visible. FIG. 2 shows a guide system in section in a transverse plane. It will be noted that FIG. 1C shows the guide system 7 when the clip 4 is in the intermediate position and FIG. 2 when the clip 4 is in the pressed-in locking position; these positions will be explained in the remainder of the disclosure. The guide system 7 comprises a notch 71, a plate 72, a first ramp 74 and a second ramp 75 formed on the female connector 2. The guide system 7 also comprises a lug 73 carried by the ring 3.

The notch 71 is formed in the female connector 2 adjoining the lateral slit 21. In particular, it can be formed by an enlargement of the lateral slit 21. The lower edge of the notch delimits the plate 72. The notch 71 exposes part of the surface of the ring 3. The notch 71 is intended to allow the foot 43 to cross, at least partially, through the female connector 2 so that the latter can bear on the plate 72. Preferably, the lateral opening 31 of the ring 3 does not comprise a similar notch, in order to hold the foot 43 on the plate 72.

The plate 72 is intended to receive the foot 43 of the clip 4 in order to maintain the clip 4 in an intermediate delivery position in the absence of the male end piece 5. This position is shown in FIG. 1C. The clip 4 cannot normally leave this position in the absence of the male end piece 5. Indeed, the clip 4 cannot be moved into the lowered position because the foot 43 is bearing on the plate 72, and neither can it be moved into the raised position because the foot 43 would come into abutment with the upper part of the notch 71.

Figure 6:
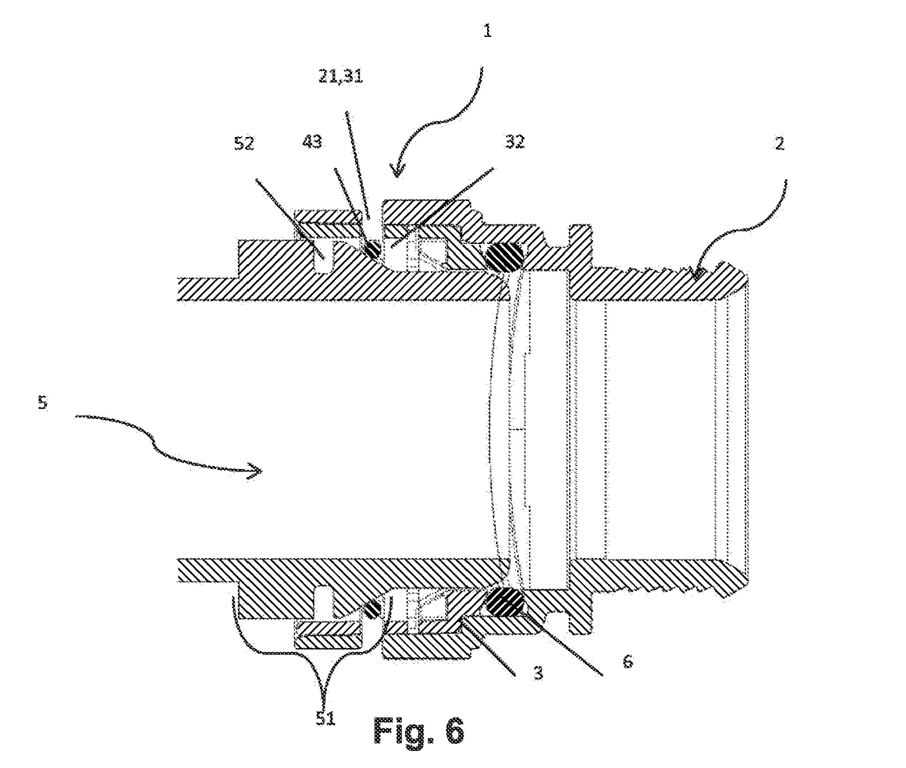
FIG. 6 shows a tubular connection device according to the present disclosure in an intermediate position in section in a longitudinal plane.

When inserting the male end piece 5, as illustrated in FIG. 6, the frustoconical collar 51 bears on the two branches 42 of the clip 4 and tends to move them away from each another, which results in at least partially removing the foot 43 from the notch 71 and from the plate 72.

Returning to the description of the guide system 7 shown in FIGS. 1C and 2, the lug 73 is arranged on a flexible tab 32 carried by the ring 3. Preferably, the flexible tab 32 is formed by a portion of the ring 3 adjoining the lateral opening 31.

The lug 73 is intended to at least partially fill the notch 71 and the plate 72 so that the foot 43 of the clip 4 can only partially rest on the plate 72 when the male end piece is inserted into the female connector 2 in the pre-locking position, its annular groove 52 then facing the lateral slits 21 and lateral openings 31.

In the absence of the lug 73, when the male end piece 5 is in the pre-locking position, the feet 43 of the clip 4, still partially on the plate 72, would tend to approach each other, to resume their initial place on the plate 72 and keep the clip 4 in the intermediate position. In fact, when the male end piece 5 is in the pre-locking position, the collar 51 no longer bears on the branches 42 to force them apart because the latter are then aligned with the groove of the collar 51. The branches 42, no longer undergoing a force aimed at separating them, would therefore tend to return to their previous position.

The lug 73 at least partially filling the notch 71 and the plate 72, the clip 4 can no longer keep its intermediate position because its feet 43 can at best only partially occupy the plate 72; the clip 4 then occupies a transitional position corresponding to the pre-locking position of the male end piece 5. The clip 4 in the transitional position can occupy substantially the same altitude as when it is in the intermediate position, that is to say that the head 41 of the clip 4 is located substantially at the same distance from the female connector 2 in both positions. In the transitional position, however, the clip 4 can switch to the pressed-in position by pressing on the head 41 of the clip 4 or to the raised position by pulling on the head 41 of the clip 4. When the clip 4 is in the transitional position, the feet 43 of the clip 4 are only partially in contact with the plate 72 (lower part of the notch 71) or with the upper part of the notch 71, and can easily slide out of notch 71. The lug 73, when it is engaged in the notch 71 by the male end piece 5 in the pre-locking position, allows the feet 43 to be released from the notch 71 in order to allow the clip 4 to switch to a pressed-in position or to a raised position.

It will be noted that in a transitional position, the feet 43 of the clip 4 still being able to rest partly on the plate 72, the branches 42 of the clip 4 can penetrate at least partly into the annular groove 52 and keep the male end piece 5 connected to female connector 2. The connection is established but is not definitive because the branches 42 can still be moved apart to take them out of the groove 52.

The first ramp 74 and the second ramp 75 interact with the foot 43 of the clip 4. The role of the first ramp 74 is to guide the clip 4 between the intermediate position, passing through the transitional position, and the raised position. The role of the second ramp 75, in turn, is to guide the clip 4 between the intermediate position, passing through the transitional position, and the pressed-in position. The first ramp 74 and the second ramp 75 are formed on the female connector 2, adjacent to the lateral slit 21. They are inclined substantially tangentially to the internal wall of the female connector 2 and separated from each other by the notch 71. In other words, the ramps 74 and 75 are inclined toward the bottom and the inside of the connection device 1.

Thus, if the head 41 of the clip 4 is pulled when it is in the transitional position in order to place it in the raised disconnection position, the foot 43 of the clip 4 comes entirely out of the plate 72 and slides on the first ramp 74, which, due to its inclination, will force the branches 42 of the clip 4 to move away from each other. In the raised position, the branches 42 of the clip 4 are spaced apart from each other so as to be substantially tangent to the female connector 2 and no longer open into its internal volume so as no longer to lock the male end piece 5 to the female connector 2, the branches 42 no longer being able to interact with the groove 52 of the male end piece 5.

Similarly, if the head 41 of the clip 4 is pressed on so as to place it in the pressed-in locking position, the foot 43 of the clip 4 is completely removed from the plate 72 and slides on the second ramp 75, which, by virtue of its inclination, will allow the branches 42 of the clip 4 to come closer to one another. In the pressed-in position, the branches 42 of the clip 4 are brought together so as to lock the male end piece 5 to the female connector 2 by penetrating more deeply into the annular groove 52 of the male end piece 5.

To prevent the clip 4 from being completely removed from the female connector 2 when the clip is placed in the raised position, the first ramp 74 can be delimited at the top by a flange, which thus forms a stop for the foot 43 of the clip 4 when the head 41 of the clip 4 is pulled. The first ramp 74 is delimited at the bottom by the notch 71.

Advantageously, the first ramp 74 can also comprise a hollow near the flange in order to form a retaining zone for the foot 43 so as to keep the clip 4 in the raised position. In the absence of this hollow, as soon as the pulling stops on the head 41 of the clip 4, the clip 4 will tend to descend to the intermediate position. Indeed, the branches 42 of the clip 4 tend to want to move closer to one another after being forced to move away from each other, having their feet 43 slide downward on the first ramp 74.

The second ramp 75 is delimited in the upper part by the plate 72 and can, advantageously, be delimited in the lower part by a bearing on which the foot 43 of the clip 4 is positioned when the clip 4 is in the pressed-in position.

Advantageously, to facilitate the passage of the clip 4 from the intermediate position, through the transitional position, to the pressed-in or raised position, the lug 73 of the flexible tab 32 of the ring 3 can form an inclined ramp substantially tangentially to the internal wall of the female connector 2. The lug 73 at least partially filling the plate 72, the ramp of the lug 73 can be used to connect the first ramp to the second ramp by supplementing or lengthening one of the two ramps, which reduces the force required to switch, from the transitional position, the foot 43 of the clip 4 onto the first or second ramp.

It will be noted that it is also possible, in the case where the lug 73 completely fills the plate 72, that the ramp of the lug 73 forms a single ramp to allow switching between the connected position and the pressed-in position without going through a transitional position, as shown in FIG. 2.

Figure 5:
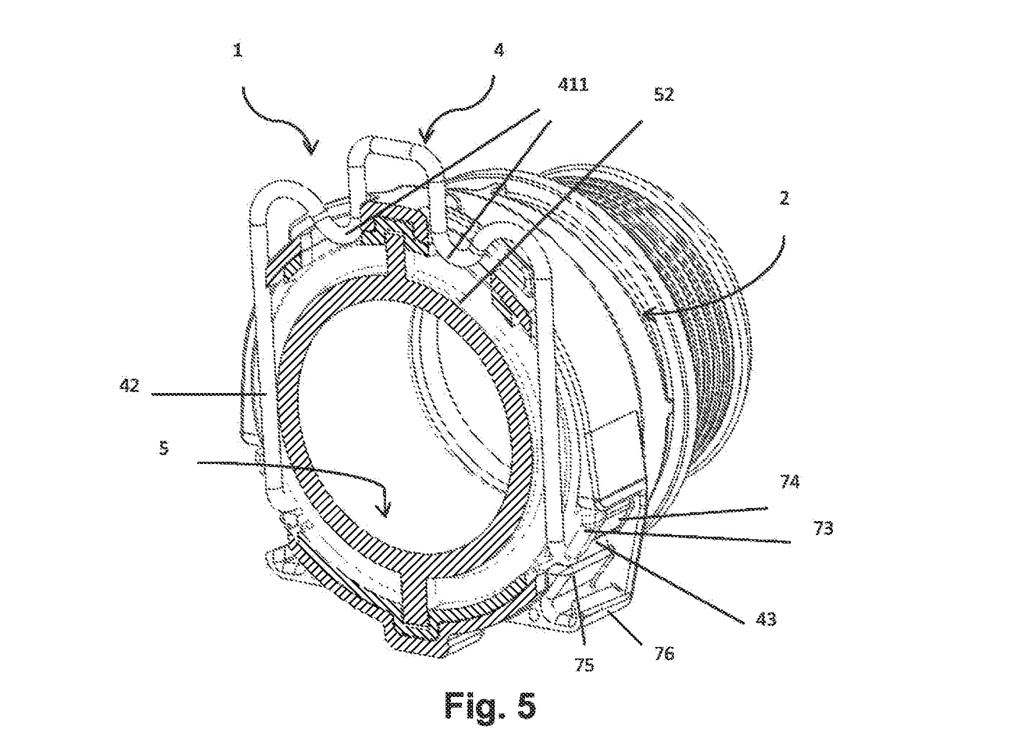
FIG. 5 shows a tubular connection device according to another embodiment of the present disclosure in perspective and in section in a transverse plane passing through the slit.
Figure 7:
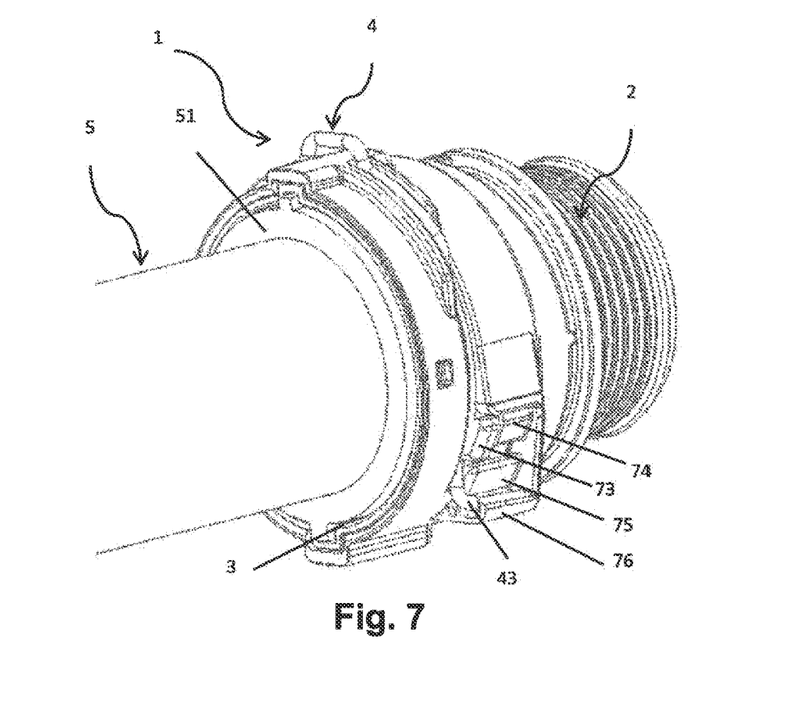
FIG. 7 shows a tubular connection device according to the present disclosure, the clip being in the pressed-in position in the presence of the male end piece, in the locked position.

The guide system 7 can also comprise a blocking element 76 formed on the female connector 2 and configured to block the separation of the branch 42 of the clip 4, when the clip 4 is in the pressed-in position. In this configuration, the feet 43 of the clip 4 come into abutment against the blocking element 76 if an attempt is made to separate the branches 42 of the clip 4 in order to remove the male end piece 5. This blocking element 76 can, advantageously, be arranged facing the lower part of the second ramp 75, where the foot 43 of the clip 4 is located when the clip 4 is in the pressed-in position, as shown in FIGS. 2, 5 and 7.

Figure 3A:
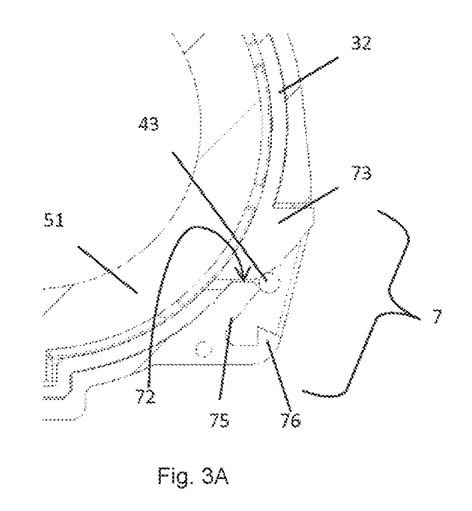
FIGS. 3A to 3C show alternative embodiments of the guide systems.
Figure 3B:
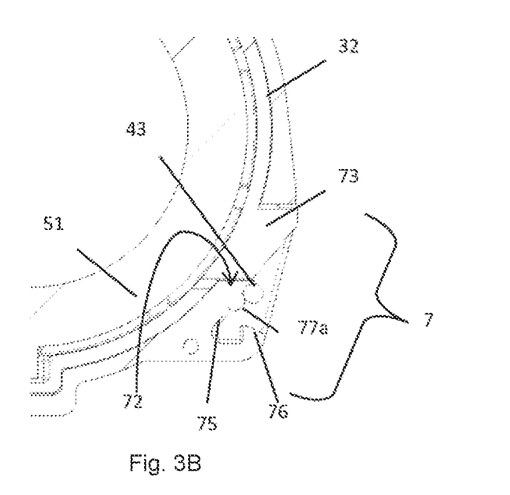
Figure 3C:
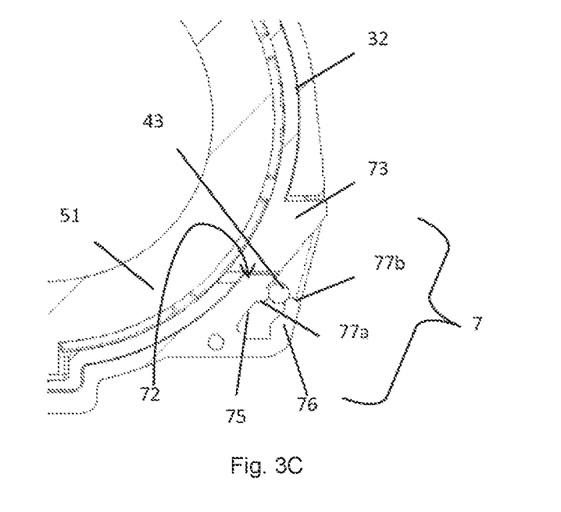

FIGS. 3A to 3C show alternative embodiments of the guide systems 7 according to the present disclosure showing other means for positioning the clip 4 in a transitional position.

In FIG. 3A, the junction between the plate 72 and the lug 73 forms a V-shaped recess, which allows the foot 43 of the clip 4 to rest partially on the end of the plate 72 when the clip 4 is in the transitional position.

In FIG. 3B, the foot 43 of the clip 4 completely leaves the plate 72 and rests, when the clip 4 is in the transitional position, on a first shoulder 77a. In this case, the transitional position of the clip 4 is between the intermediate position and the pressed-in position, the head 41 of the clip 4 descending slightly to position the foot 43 on the first shoulder 77a.

FIG. 3C is a variant of the configuration of FIG. 3B. In this embodiment, a second shoulder 77b is arranged facing the first shoulder 77a so that the two shoulders 77a and 77b are separated by a space, which is substantially less than the width of the foot 43. Advantageously, this second shoulder 77b is carried by the blocking element 76. In this transitional position configuration, it will be necessary to exert an additional pressure force to pass the foot 43 through the space between the two shoulders 77a and 77b in order to position the clip 4 in the pressed-in position. The crossing of the foot 43 between the two shoulders 77a and 77b produces an audible click, which provides an additional indicator of the switching of the clip 4 to the pressed-in position.

Figure 4:
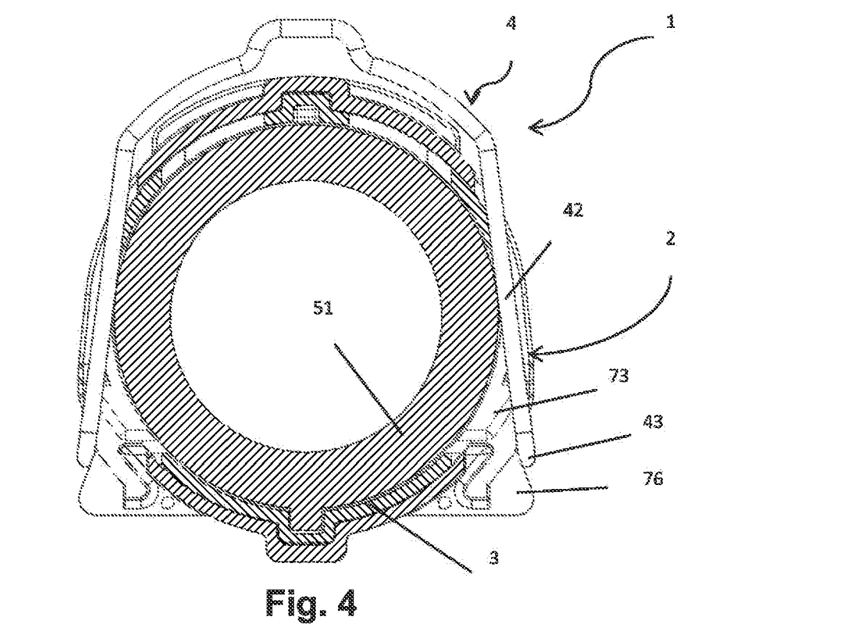
FIG. 4 shows a tubular connection device according to one embodiment of the present disclosure in section in a transverse plane passing through the lateral slit.

FIGS. 4 and 5 show two alternative embodiments of a tubular connection device 1. The device 1 is provided with means for preventing the clip 4 from being placed in the pressed-in position during the insertion of the male end piece 5 before the latter is in the pre-locking position.

In FIG. 4, the outer surface of the blocking element 76 forms a third ramp inclined toward the bottom and the outside of the female connector 2. The aim is to be able to automatically return the clip to the intermediate position if the clip 4 can be lowered when the male end piece is not correctly positioned in the pre-locking position. Indeed, if the clip 4 comes down while the male end piece 5 is not in the locking position, the foot 43 of the clip 4 comes to bear on the outer surface of the blocking element 76 and is guided to return the clip 4 to the intermediate position when no more pressure is exerted on the head 41 of the clip 4. The foot 43 of the clip 4 resting on the third ramp, which forces the branches 42 to move away from each other, when the clip 4 is lowered, will tend to go up along the third ramp when no bearing is exerted on the head of the clip 4, to allow the branches 42 to come closer to one another.

In FIG. 5, the head 41 of the clip 4 has at least one stop 411, cooperating with holes made in the female connector 2, to prevent the clip 4 from being positioned in the pressed-in position during the insertion of the male end piece 5, as long as it does not occupy the pre-locking position. The stop 411 of the head 41 comes into contact with the male end piece 5 and its frustoconical collar 51 and prevents the clip 4 from descending into the locking position as long as the stop 411, and therefore the branches 42 of the clip 4, are not aligned with the groove 52 of the male end piece 5. Advantageously, the head 41 of the clip 4 can have a W shape with the two points of the W forming two separate stops 411.

Implementation of the Tubular Connection Device

Before the insertion of the male end piece 5, the clip 4 is initially positioned in the intermediate delivery position. In this position, illustrated in FIG. 1C, the feet 43 of the clip 4 can slightly penetrate toward the inside of the connection device 1 by pushing the lugs 73 of the flexible tabs 32 out of the notch 71. It will be recalled that in this position, it is possible to separate the branches 42 of the clip 4 from one another to allow the frustoconical collar 51 of the male end piece 5 to pass. In addition, in this position, the clip 4 can neither move in the raised disconnection position nor in the pressed-in locking position in the absence of the male end piece 5.

If, however, the operator positions the clip 4 in the pressed-in position in the absence of the male end piece 5, then it would be impossible to insert the male end piece 5 into the connection device 1, the blocking element 76 preventing the separation of the branches 42 of the clip 4 to allow the passage of the frustoconical collar 51.

The clip 4 being in the intermediate delivery position, the male end piece 5 is introduced through the connection device 1, as illustrated in FIG. 6. During the insertion of the male end piece 5, the frustoconical collar 51 first comes to bear on the branches 42 of the clip 4 and forces them to move away from one another. Thus, due to the separation of the branches 42, the feet 43 of the clip 4 are pushed at least partially out of the plate 72 and the clip 4 is in a transitional position. Secondly, the frustoconical collar 51 bears on the flexible tabs 32 so that the lug 73 can occupy the space left free by the foot 43 of the clip 4 in the notch 71. These two stages may overlap in part, the collar 51 being able to come to bear on the tabs while it finishes separating the branches 42 of the clip 4.

When the male end piece 5 is in the pre-locking position, the branches 42 of the clip 4 can only partially penetrate into the groove 52 because the lugs 73 are held in the notch 71 by the bearing of the collar 51 on the flexible tabs 32 so as to at least partially fill the plate 72. The clip 4 can then only occupy the transitional position illustrated in FIGS. 3A to 3C. It is noted that in this position, the branches 42 are partly in the groove 52 and therefore provide a connection, which is, however, not secure.

Figure 8:
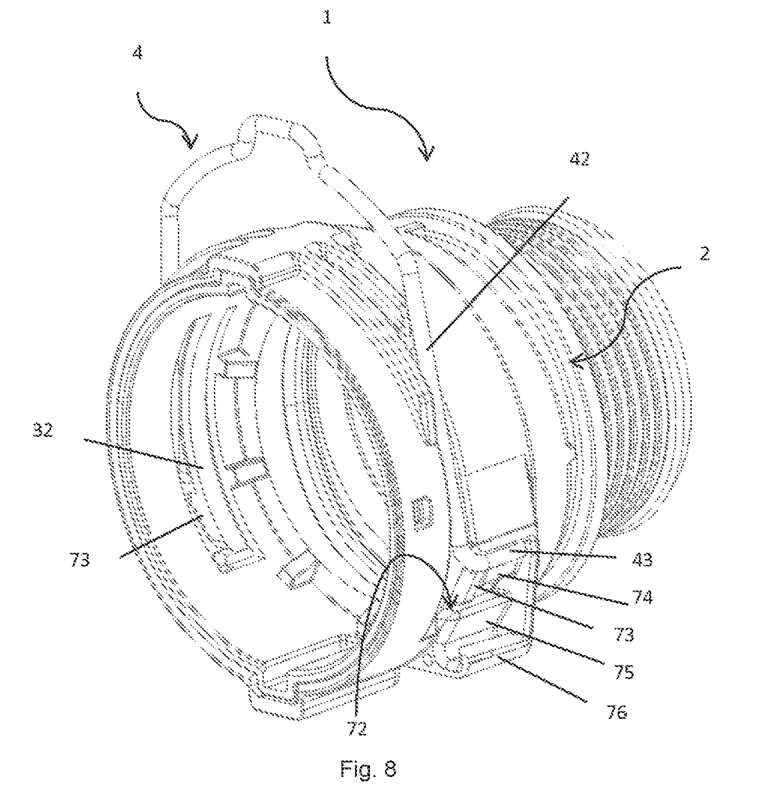
FIG. 8 shows a tubular connection device according to the present disclosure, the clip being in the raised position.

In this position, the clip 4 can then switch to the pressed-in position as shown in FIG. 7 or to the raised position as shown in FIG. 8 depending on whether pressure or traction is, respectively, exerted on the head 41 of the clip 4.

It will be noted that it is also possible to envisage that there is no transitional position. Indeed, the clip 4 could automatically switch to the pressed-in position when the male end piece 5 is in the pre-locking position. This is particularly the case when the foot 43 completely leaves the plate 72 and there are no shoulders 77a and 77b to hold it in the transitional position. The foot 43 is then directly aligned with the second ramp 75 and automatically slides to the pressed-in position.

By exerting pressure on the head 41 of the clip 4, the clip 4 leaves the unstable transitional position and the foot 43 of the clip 4 completely leaves the plate 72, and/or the shoulders 77a and 77b if they are present, to follow the second ramp 75 until reaching the pressed-in position where the head 41 of the clip 4 is likely to be in abutment with the upper part of the female connector 2. During the descent of the clip 4, the feet 43 follow the inclination of the second ramp 75, which tends to bring them closer to each other to close the branches 42 on the annular groove 52 of the male end piece 5. It will be recalled that the blocking element 76 prevents the separation of the branches 42 of the clip 4 as long as the clip 4 remains in the pressed-in position. Thus, the male end piece 5 is correctly locked to the female connector 2 when the clip 4 is in the pressed-in position, this position visually indicating the proper locking state of the male end piece 5 in the connection device 1.

By exerting traction on the head of the clip 4, the clip 4 leaves the unstable transitional position and the foot 43 completely leaves the plate 72, and/or the shoulders 77a and 77b, guided by the first ramp 74 until reaching the raised position where the head 41 of the clip 4 is furthest from the upper part of the female connector 2. During the ascent of the clip 4, the feet 43 follow the inclination of the first ramp 74, which tends to move them away from each other. The branches 42 are therefore separated so that they no longer open out inside the internal volume of the connection device 1 and no longer obstruct the passage of the collar 51. This raised position of the clip 4 also corresponds to the dismantling (or disconnection) position of the connection device 1.

It will be noted that as long as the male end piece 5 remains in the pre-locking position, it is possible to easily move the clip 4 from the pressed-in position to the raised position and vice versa, the lug 73 replacing and/or completing the first ramp 74 and the second ramp 75.

Thus, this connection device 1 makes it possible to obtain a secure connection of a male end piece 5 in a female connector 2 in two steps, the first step being the insertion of the male end piece 5 and the second step being the lowering of the clip 4 in the pressed-in locking position. The two steps can only be performed in this specific order. Indeed, if the second step is performed before the first step, it will not be possible to perform the first step because the branches 42 of the clip 4 cannot move apart when the clip 4 is in the pressed-in position. It will also be noted that the first step alone can already make it possible to retain the male end piece 5 in the female connector 2 without, however, constituting a secure connection. In fact, in the transitional position, the branches 42 of the clip 4, the feet 43 of which are still at least partially on the plate 72, can partially penetrate into the annular groove 52 and block the male end piece 5, but nothing, however, prevents the branches 42 from moving away from the groove 52 and releasing the male end piece 5 in this transitional position.

As will be readily understood, the present disclosure is not limited to the described embodiments, and it is possible to add variants thereto without departing from the scope of the invention as defined by the claims.

In the detailed description, it was considered that the flexible tab 32 and the guide system 7 were located downstream of the lateral openings 31 and lateral slits 21 with respect to the direction of insertion of the male end piece 5. It was also considered that the L shape of the feet 43 of the clip 4 was oriented in this insertion direction. Obviously, it is quite possible to modify this arrangement in order to adapt it to the case where the flexible tab 32 is located upstream of the lateral opening 31. To this end, it suffices to place the guide system 7 upstream of the lateral slit 21 and to place the clip 4 so that the L shape of the feet 43 is oriented in the direction of removal of the male end piece 5.

In this case, it is the flexible tabs 32 that separate the branches 42 instead of the collar 51. Indeed, the collar 51 first meets and separates the flexible tabs 32, which, by means of the contact of the lugs 73 with the feet 43 of the clip 4, will force the branches 42 to move apart.

The invention claimed is:
1. A tubular connection device, comprising:
a female connector into which a male end piece having an annular groove may be inserted, the female connector having two lateral slits that are symmetrical with respect to a radial axis;

a U-shaped locking clip comprising a head and two branches, the U-shaped locking clip configured to straddle the female connector, each branch extending into a lateral slit of the two lateral slits and ending with a foot;

two lateral guide systems that are symmetrical with respect to the radial axis, cooperating with the feet of the clip to keep the clip in a raised position of disconnection of the male end piece or in a pressed-in position for locking the male end piece in the female connector; and a ring configured to be arranged against an internal wall of the female connector;

wherein each guide system of the two lateral guide systems comprises:

a notch formed in the female connector adjacent to the lateral slit;

a plate delimiting a lower edge of the notch and on which the foot rests to keep the clip in an intermediate position between the raised position and the pressed-in position in the absence of a male end piece; and a lug arranged on a flexible tab carried by the ring and configured to at least partially fill the notch and the plate when the male end piece is inserted into the female connector, the annular groove of the male end piece facing the lateral slits to allow the clip to switch to the pressed-in position or to the raised position.

2. The device of claim 1, wherein each guide system comprises a first ramp for guiding the foot between the raised and intermediate positions of the clip, and a second ramp for guiding the foot between the intermediate and pressed-in positions, the first ramp and the second ramp being formed on the female connector.

3. The device of claim 2, wherein the first ramp and the second ramp are inclined substantially tangentially to the internal wall of the female connector and separated from each other by the notch.

4. The device of claim 3, wherein the first ramp is delimited in a lower part by the notch and in an upper part by a flange forming a stop for the foot of the clip.

5. The device of claim 4, wherein the first ramp comprises a hollow near the flange forming a retaining zone for the foot, so as to keep the clip in the raised position.

6. The device of claim 5, wherein the second ramp is delimited in the upper part by the plate and in the lower part by a bearing on which the foot of the clip is positioned when the clip is in the pressed-in position.

7. The device of claim 6, wherein the lug partially fills the plate when the male end piece is inserted, the annular groove of the male end piece being opposite the lateral slits, the foot of the clip resting on an unfilled edge of the plate placing the clip in a transitional position between the intermediate position and the pressed-in position.

8. The device of claim 7, wherein the second ramp comprises a first shoulder on which the foot of the clip is able to rest to place the clip in a transitional position between the intermediate position and the pressed-in position.

9. The device of claim 8, wherein each guide system comprises a blocking element formed on the female connector and configured to block the separation of the branch of the clip when the clip is in the pressed-in position.

10. The device of claim 9, wherein the blocking element comprises a second shoulder facing the first shoulder, the two shoulders being separated by a space substantially less than a width of the foot.

11. The device of claim 9, wherein an outer surface of the blocking element forms a third ramp inclined toward a bottom and an outside of the female connector.

12. The device of claim 9, wherein the lug of the flexible tab forms a ramp inclined substantially tangentially to the internal wall of the female connector.

13. The device of claim 1, wherein the flexible tab comprises a portion adjoining a lateral opening of the ring.

14. The device of claim 1, wherein the head of the clip has at least one stop cooperating with holes in the female connector to prevent the positioning of the clip in the pressed-in position during the insertion of the male end piece as long as its annular groove is not facing the lateral slits.

15. The device of claim 1, wherein the notch is formed by an enlargement of the lateral slit.

16. The device of claim 2, wherein the first ramp is delimited in a lower part by the notch and in an upper part by a flange forming a stop for the foot of the clip.

17. The device of claim 2, wherein the second ramp is delimited in an upper part by the plate and in the lower part by a bearing on which the foot of the clip is positioned when the clip is in the pressed-in position.

18. The device of claim 1, wherein the lug partially fills the plate when the male end piece is inserted, the annular groove of the male end piece being opposite the lateral slits, the foot of the clip resting on an unfilled edge of the plate placing the clip in a transitional position between the intermediate position and the pressed-in position.

19. The device of claim 1, wherein each guide system comprises a blocking element formed on the female connector and configured to block the separation of the branch of the clip when the clip is in the pressed-in position.

20. The device of claim 1, wherein the lug of the flexible tab forms a ramp inclined substantially tangentially to the internal wall of the female connector.

* * * * *